1

US008423279B2

(12) United States Patent
Kitagawa et al.

(10) Patent No.: US 8,423,279 B2
(45) Date of Patent: Apr. 16, 2013

(54) DRIVE ASSIST APPARATUS, METHOD, AND RECORDING MEDIUM

(75) Inventors: Eiji Kitagawa, Kawasaki (JP); Takuro Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 349 days.

(21) Appl. No.: 12/953,746

(22) Filed: Nov. 24, 2010

(65) Prior Publication Data

US 2011/0130964 A1    Jun. 2, 2011

(30) Foreign Application Priority Data

Nov. 30, 2009  (JP) ................. 2009-272709

(51) Int. Cl.
*G06F 17/00* (2006.01)
*G01C 21/00* (2006.01)
*G08G 1/123* (2006.01)

(52) U.S. Cl.
USPC ............... 701/301; 701/22; 701/23; 701/410; 701/411; 701/414; 701/701; 701/416; 701/417; 701/431

(58) Field of Classification Search ............ 701/22, 701/23, 301, 410, 411, 414, 416, 417, 431, 701/457, 516, 532, 533, 70; 318/587; 340/990, 340/995.1, 995.21, 995.22; 362/465, 466, 362/467
See application file for complete search history.

(56) References Cited

U.S. PATENT DOCUMENTS

| 7,437,244 | B2 * | 10/2008 | Okada ...................... 701/301 |
| 2002/0177947 | A1 * | 11/2002 | Cayford .................... 701/209 |
| 2004/0103007 | A1 * | 5/2004 | Wahlbin et al. ............. 705/4 |
| 2004/0103008 | A1 * | 5/2004 | Wahlbin et al. ............. 705/4 |

FOREIGN PATENT DOCUMENTS

| JP | 2006-31573 A | 2/2006 |
| JP | 2006-58918 A | 3/2006 |
| JP | 2006-251836 A | 9/2006 |
| JP | 2008-59493 A | 3/2008 |
| JP | 2008-191909 A | 8/2008 |
| JP | 2008-210066 A | 9/2008 |
| JP | 2008-217296 A | 9/2008 |
| JP | 2009-9430 A | 1/2009 |

* cited by examiner

*Primary Examiner* — Ian Jen
(74) *Attorney, Agent, or Firm* — Fujitsu Patent Center

(57) ABSTRACT

A drive assist apparatus includes: a road-information storage unit storing road information; a traffic-signal information storage unit to store information regarding a traffic-signal change timing; a receiving unit to receive other-vehicle information; an obtaining unit to obtain host-vehicle information; a determining unit to determine whether the other vehicle becomes an obstacle to the host vehicle; and a calculating unit to calculate a recommended speed based on the host-vehicle information, the road information, and information regarding the traffic-signal change timing, when the other vehicle is determined to not become an obstacle to the host vehicle, and calculate the recommended speed based on the host-vehicle information, the road information, the information regarding the traffic-signal change timing, and an arrival delay time for avoiding an obstacle caused by the other vehicle, when the other vehicle is determined to become the obstacle to the host vehicle.

15 Claims, 13 Drawing Sheets

DRIVE ASSIST APPARATUS, METHOD, AND RECORDING MEDIUM

CROSS-REFERENCE TO RELATED APPLICATIONS

This application is based upon and claims the benefit of priority of the prior Japanese Patent Application No. 2009-272709, filed on Nov. 30, 2009, the entire contents of which are incorporated herein by reference.

FIELD

Various embodiments described herein relate to a drive assist apparatus, method, and recording medium.

BACKGROUND

Intelligent Transportation Systems (ITS) have been proposed as traffic systems in which information communications technology is used to exchange information about people, roads, and vehicles in order to achieve prevention of traffic accidents, relief of traffic congestion, and so on. Examples of the ITS include a car navigation system and a road-traffic-information system (e.g., a VICS (Vehicle Information and Communication System)), an automatic toll payment system (e.g., ETC (Electronic Toll Collection system)), and a bus location system.

In such ITS technologies, vehicle-to-vehicle communication, in which multiple vehicles communicate with each other, and road-to-vehicle communication, in which communication is performed between base stations provided along roads and vehicles, are performed to transmit/receive information.

Japanese Laid-Open Patent Publication No. 2006-31573 discusses a drive assist system that is configured so that vehicles obtain road information by utilizing the road-to-vehicle communication and instructions about vehicle travel speed conditions are issued so that the vehicles do not need to stop at red signals at intersections.

In the above Publication document, it is proposed that a recommended speed for enabling the vehicles to pass through an intersection is calculated at a point that is away from the intersection by a certain distance and speed control is performed so that the vehicles do not need to stop at the red signal at the intersection.

In the above Publication document, however, the proposed technology is based on the premise that all vehicles travel straight at the intersections and does not consider a speed reduction due to, for example, right and left turns of the vehicles traveling ahead at the intersection.

Japanese Laid-Open Patent Publication No. 2006-251836 discusses a system that is configured to recalculate a recommended speed of a vehicle at regular time intervals or regular travel distances, considering, for example, the states of vehicles traveling ahead.

SUMMARY

According to an aspect of the invention, a drive assist apparatus includes: a road-information storage unit to store road information; a traffic-signal information storage unit to store information regarding change timing of a traffic signal; a receiving unit to receive other-vehicle information; an obtaining unit to obtain host-vehicle information; a determining unit to determine whether the other vehicle becomes an obstacle to the host vehicle, by comparing the other-vehicle information and the host-vehicle information; and a calculating unit to calculate a recommended speed based on the host-vehicle information, the road information, and information regarding the traffic-signal change timing, when the other vehicle is determined to not become an obstacle to the host vehicle, and calculate the recommended speed based on the host-vehicle information, the road information, the information regarding the traffic-signal change timing, and an arrival delay time for avoiding an obstacle caused by the other vehicle, when the other vehicle is determined to become the obstacle to the host vehicle.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
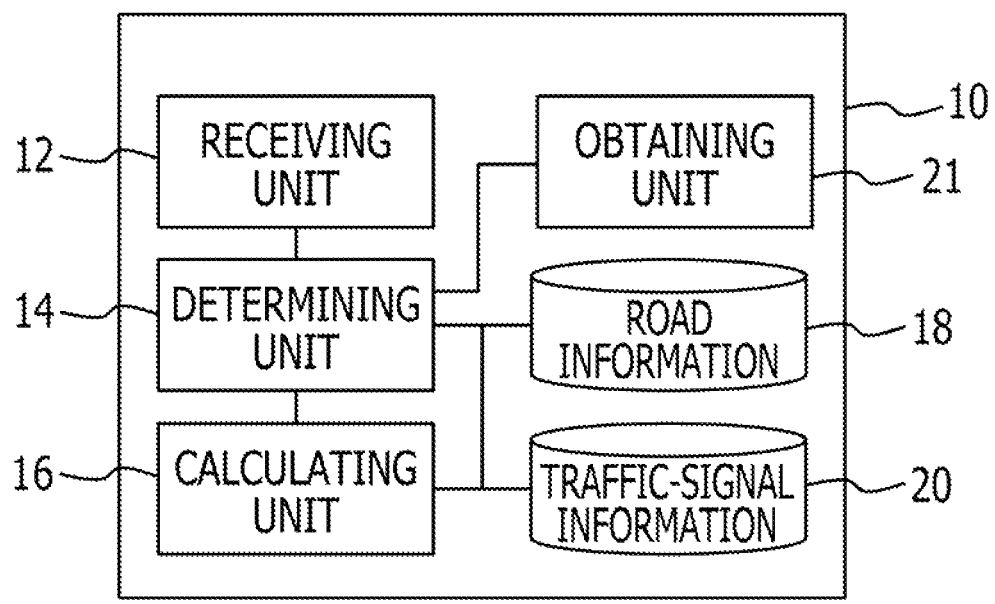
FIG. 1 is a functional block diagram of an example of a first embodiment of a drive assist apparatus.

Reference will now be made in detail to the embodiments, examples of which are illustrated in the accompanying drawings, wherein like reference numerals refer to the like elements throughout. The embodiments are described below to explain the present invention by referring to the figures.

In Japanese Laid-Open Patent Publication No. 2006-251836, when the speed of the host vehicle changes in response to behavior of surrounding vehicles including a vehicle traveling ahead, a recommended speed corresponding to the travel state is recalculated. That is, the recommended speed is corrected after an influence of speed reduction of the host vehicle or the like is received. Such a system, therefore, has problems in that the amount of fluctuation in the speed of the vehicle is large and the amount of fuel consumed increases.

A drive assist apparatus according to a first embodiment will be described below with reference to the accompanying drawings.

FIG. 1 is a block diagram illustrating one example of a functional configuration of a drive assist apparatus 10.

The drive assist apparatus 10 according to the embodiment may be a computer including a receiving unit 12, a determining unit 14, a calculating unit 16, a road-information storage unit 18, a traffic-signal-information storage unit 20, and an obtaining unit 21. The drive assist apparatus 10 is installed in a vehicle.

The road-information storage unit 18 serves as a storage unit that stores road information specifying locations and distances of roads and legal regulations such as speed limits, one-way road, and so on. The road-information storage unit 18 is capable of using map information provided by a car navigation system.

The traffic-signal-information storage unit 20 serves as a storage unit that stores information regarding timings of changes of traffic signals at intersections. As with the information regarding the change timings of the traffic signals, control periods of signal lights at intersections may also be pre-stored in the form of a database in the storage area. Through reception of signal-light state information transmitted via specified base stations provided in the vicinities of roads, the traffic-signal-information storage unit 20 may also store the traffic-light state information as the information regarding the change timings of the traffic signals located ahead of the vehicle.

The receiving unit 12 serves as a processor for receiving, at least, other-vehicle information including information regarding positions and speeds of the other vehicles. The drive assist apparatus 10 may receive the other-vehicle information through information communication with other vehicles to thereby obtain current position information and speed information of other vehicles. When a specified center collects the position information and the speed information of the vehicles, the drive assist apparatus 10 may also receive, from the receiving unit 12, the other-vehicle information transmitted from the center via the specified base stations provided in the vicinities of roads. For directly receiving the other-vehicle information from other vehicles, the receiving unit 12 may have a wireless LAN (local area network) transmitting/receiving unit based on IEEE 802.11p or the like. For receiving the other-vehicle information via the base stations provided in the vicinities of roads, the receiving unit 12 may also have a wireless transmitting/receiving unit based on DSRC (Dedicated Short Range Communication). IEEE 802.11p is a wireless LAN standard using a 5.9 GHz band. DSRC is a narrowband wireless communication standard for vehicle-to-vehicle communication.

The obtaining unit 21 serves as a processor that obtains host-vehicle information including the current speed of a host vehicle. Examples of the host-vehicle information include speed information detected by a speed sensor for detecting the number of rotations of an axle, speed information determined based on history of position information obtained from a global positioning system (GPS), vehicle position information obtained from a car navigation system or another GPS-function-equipped device, and position information obtained through reception of radio waves from beacons or the like installed in the vicinities of roads.

The determining unit 14 serves as a processor that determines whether or not travel of the host vehicle is interfered with by another vehicle, by comparing the other-vehicle information received from the receiving unit 12 with the current host-vehicle information. For example, on the basis of the other-vehicle information transmitted from another vehicle located ahead of the host vehicle, the determining unit 14 determines whether or not the other vehicle interferes with the travel of the host vehicle when the host vehicle travels at the current speed.

The calculating unit 16 serves as a processor that determines a recommended speed so that a speed change due to influences of other vehicles and traffic lights at intersections are reduced, on the basis of the current host-vehicle position, the road information held by the road-information storage unit 18, the traffic-signal change timing held by the traffic-signal-information storage unit 20, and the other-vehicle information.

For example, when the determining unit 14 determines that the travel of the host vehicle is not interfered with by another vehicle when the host vehicle travels at the current speed, the calculating unit 16 determines a recommended speed on the basis of the current host-vehicle information, the road information held by the road-information storage unit 18, and the traffic-signal change timings held by the traffic-signal-information storage unit 20.

For example, when the determining unit 14 determines that the travel of the host vehicle is interfered with by another vehicle when the host vehicle travels at the current speed, the calculating unit 16 determines a recommended speed on the basis of the current host-vehicle information, the road information held by the road-information storage unit 18, the traffic-signal change timings held by the traffic-signal-information storage unit 20, and arrival delay information for avoiding an obstacle caused by another vehicle.

Figure 2:
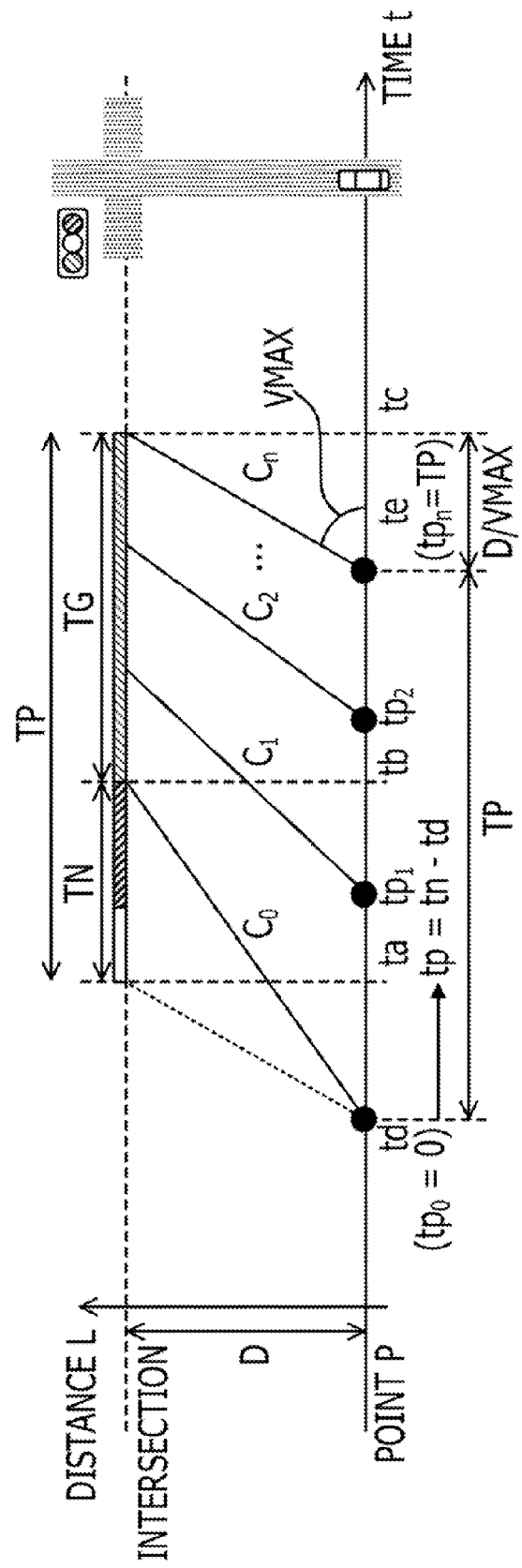
FIG. 2 is a diagram of an example of determining a recommended speed.

FIG. 2 is a diagram illustrating an example in which the calculating unit 16 determines a recommended speed when the travel of the host vehicle is not interfered with by another vehicle. In FIG. 2, the vertical axis indicates a distance L, the horizontal axis indicates time t, and D indicates the distance between a point P at which the host vehicle is currently located and an intersection located ahead in the travel direction of the host vehicle.

VMAX indicates a permissible maximum speed at which vehicles may travel on the basis of a speed limit designated for the road under the law.

In addition, ta indicates a time at which a yellow signal and a red signal are turned on at the intersection, tb indicates a time at which a green signal is turned on at the intersection, and tc indicates a time at which the green signal is turned off. In this case, for convenience of the description, the vehicle is assumed to stop when the yellow signal is turned on, and the time at which the yellow signal is turned on and the time at which the red signal is turned on are assumed to be substantially the same time ta.

The traffic-signal period TP at the intersection is a period between the time ta at which the yellow signal and the red signal are turned on and the time tc at which the green signal is turned off and is thus may be expressed by TP=tc−ta. The duration TN in which the yellow signal and the red signal are turned on is expressed by TN=tb−ta and the duration TG in which the green signal is turned on is expressed by TG=tc−tb.

In order to pass through the intersection at the permissible maximum speed VMAX while the green signal is turned on, the vehicle should pass through the point P at time te. The final time te at which the vehicle may pass through the intersection at the green signal at the maximum speed VMAX may be expressed by te=tc−(D/VMAX).

This means that, when the time earlier than time to by the traffic-signal duration TP is expressed by td, a vehicle that passes through the point P at the time td does not arrive at the intersection before time to at which the yellow and red signals are turned on, even when the vehicle travels at the permissible maximum speed VMAX.

In FIG. 2, tn indicates current time and tp indicates relative time of the current time tn relative to time td.

When the time at which the vehicle passes through the point P is expressed by time $tp_i$ relative to the time td (i is an integer that satisfies $0 \leq i \leq n$), a virtual vehicle $C_0$ that passes through the point P at relative time $tp_0=0$ exists for i=0 and a virtual vehicle $C_n$ that passes through the point P at relative time $tp_n=TP$ exists for i=n.

In order for the vehicle that passes through the point P at the relative time $tp_0=0$ to arrive at the intersection at the time tb at which the green signal is turned on and in order for the vehicle that passes through the point P at the relative time $tp_n=TP$ to arrive at the intersection by the time tc at which the green signal is turned off, it is preferred to make the rate of the relative time $tp_i$ in the traffic-signal period to match the rate of, in the green-signal duration TG, the relative time tb from the green-signal turn-on time tb at which the vehicle arrives at the intersection, where the relative time $tp_i$ is a time at which the vehicles passing through the point P between relative time $tp_0=0$ and relative time $tp_n=TP$ and the relative time from the green-signal turn-on time tb is a time at which the vehicle arrives at the intersection.

Thus, in order for each of the vehicles $C_0$ to $C_n$ to pass through the intersection in the duration TG of the green signal, a recommended time $topt_i$ for travel from the point P to the intersection is expressed by $topt_i = D/VMAX + (1-tp_i/TP) \cdot TN$. Based on the equation, a recommended speed $vopt_i$ of each of the vehicles $C_0$ to $C_n$ is expressed by $vopt_i = D/topt_i$.

This point will be described in more detail with reference to FIG. 3.

Figure 3:
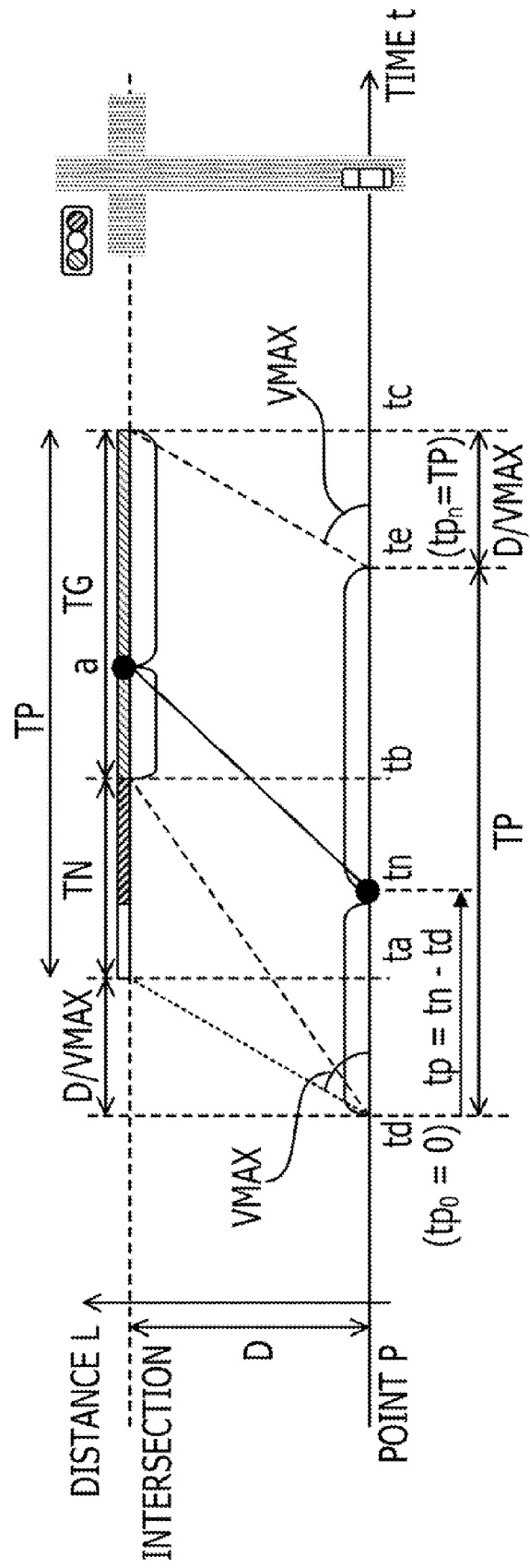
FIG. 3 is a diagram of an example of determining an arrival time of a vehicle at an intersection.

FIG. 3 is a diagram illustrating a case in which the vehicle that passes through the point P at the relative time tn arrives at the intersection at arrive time a.

The arrival time a at which the vehicle passing through the point P at time tn may be given as follows.

$$a = tb + (tn - td) \cdot TG/TP$$
$$= tb + tp \cdot TG/TP$$
$$= (td + D/VMAX + TN) + tp \cdot (TP - TN)/TP.$$

Therefore, the recommended time topt for the vehicle that passes through the point P at the relative time tn to arrive at the intersection may be determined as follows.

$$topt = a - tn$$
$$= a - (tp + td)$$
$$= (td + D/VMAX + TN) + tp \cdot (TP \cdot TN)/TP \cdot (tp + td)$$
$$= D/VMAX + TN + tp - tp \cdot TN/TP - tp$$
$$= D/VMAX + TN - tp \cdot TN/TP$$
$$= D/VMAX + (1 - tp/TP) \cdot TN.$$

Based on the recommended time topt, the recommended speed vopt may be determined by D/topt.

However, when no vehicle is travelling ahead of the host vehicle and the host vehicle may pass through the intersection within the range of the time tb at which the green signal is turned on to the time tc at which the green signal is turned off even when the host vehicle travels at the permissible maximum speed VMAX, the recommended speed may be set to the permissible maximum speed VMAX.

While a case in which the recommended time topt and the recommended speed vopt are determined in an example of a case in which virtual vehicles exist ahead of and behind the host vehicle has been described in the example illustrated in FIGS. 2 and 3, a method for determining a recommended speed when a vehicle is actually travelling ahead will be described below.

Figure 4:
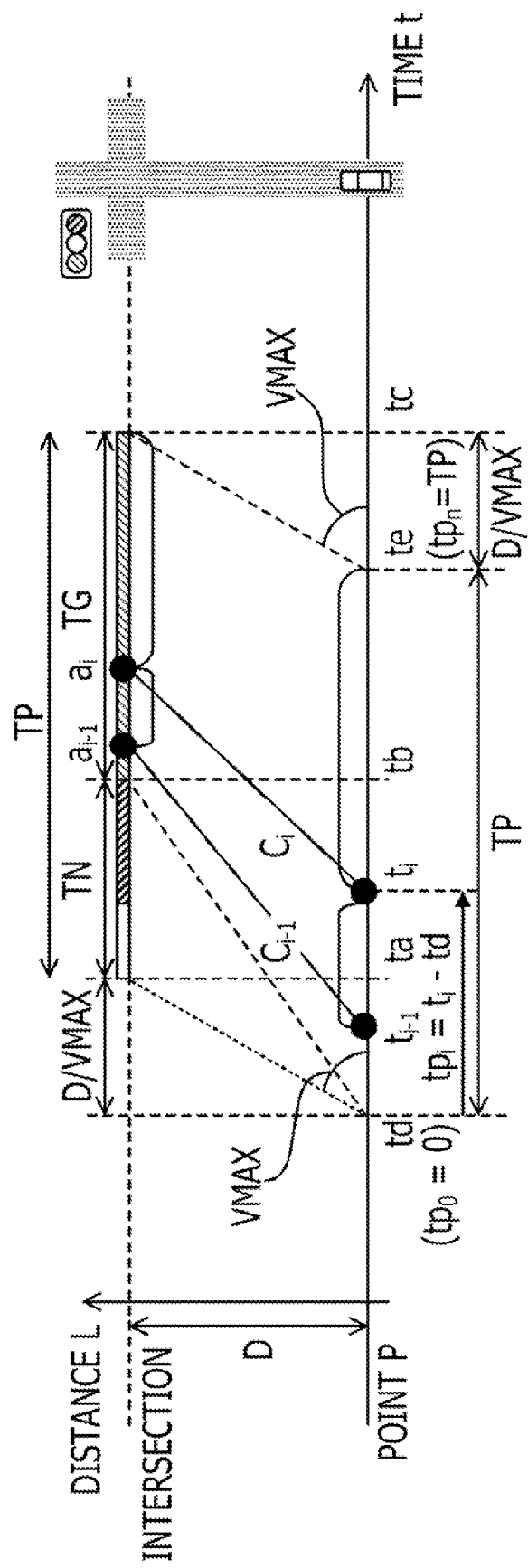
FIG. 4 is a diagram of an example of determining a recommended speed according to a first embodiment.

FIG. 4 is a diagram illustrating an example in which the calculating unit 16 determines a recommended speed when another vehicle is travelling ahead of the host vehicle.

Now, a description will be given of a case in which a vehicle passing through the point P at time $t_i$ determines a recommended speed in accordance with the travel state of another vehicle that passed through the point P at time $t_{i-1}$ and that is traveling ahead.

The time at which a vehicle $C_i$ that passes through the point P at time $t_i (0 < i \leq n)$ arrives at the intersection is indicated by $a_i$ and the time at which a vehicle $C_{i-1}$ that is travelling ahead of the vehicle $C_i$ and that passed through the point P at time $t_{i-1}$ arrives at the intersection is indicated by $a_{i-1}$. The arrival time $a_i$ of the host vehicle in this case may be expressed by the following equation.

$$a_i = a_{i-1} + (tc - a_{i-1}) \cdot (t_i - t_{i-1})/(te - t_{i-1}).$$

The recommended time $topt'_{i-1}$ may be expressed as follows.

$$topt'_i = a_i - t_i$$
$$= a_{i-1} + (tc - a_{i-1}) \cdot (t_i - t_{i-1})/(te - t_{i-1}) - t_i.$$

Since the recommended time $topt'_{i-1}$ of the other vehicle traveling ahead is expressed by $topt'_{i-1} = a_{i-1} - t_{i-1}$, substitution of the above-noted equation thereinto may yield:

$$topt'_i = (D/VMAX) \cdot (t_i - t_{i-1})/(te - t_{i-1}) + top'_{i-1} \cdot (te - t_i)/(te - t_{i-1}).$$

Therefore, the recommended time $top'_i$ of the host vehicle may be determined in accordance with the recommended time $top'_{i-1}$ of the other vehicle travelling ahead.

The recommended time top) may be expressed relative to time relative to the time td, as follows.

$$topt'_i = (D/VMAX) \cdot (tp_i - tp_{i-1})/(TP - tp_{i-1}) + topt'_{i-1} \cdot (TP - tp_i)/(TP - tp_{i-1})$$

The recommended time $topt'_0$ of the vehicle passing through the point P at the time $td(tp_0=0)$ is expressed by $topt'_0 = tb - td$ and the recommended speed $vopt'_i$ is expressed by $vopt'_i = D/topt'_i$.

Upon determining that the travel of the host vehicle is not interfered with by another vehicle when the host vehicle travels at the current speed, the drive assist apparatus 10 determines the recommended speed on the basis of the current host-vehicle information, the road information, and the traffic-signal change timing. Thus, the drive assist apparatus 10 may determine the recommended speed such that the duration of a stop at an intersection where a traffic light is installed may be reduced. When the driver of the vehicle drives the vehicle at the determined recommended speed, it is possible to reduce a change in the speed of the vehicle. Also, when the driver drives the vehicle in accordance with the recommended speed, it is possible to relieve traffic congestion and also possible to contribute to road safety. Since a change in the speed may also be reduced or prevented, the amount of fuel consumed may also be reduced.

A drive assist apparatus 10 according to a second embodiment will be described below with reference to the accompanying drawings.

The second embodiment is directed to a case in which a recommended speed is determined considering a delay time resulting from a case in which another vehicle traveling ahead of the host vehicle stops at the red signal at an intersection and then starts moving when the green signal is turned on.

The drive assist apparatus 10 according to the second embodiment may have functions that are similar to those of the block diagram illustrated in FIG. 1.

Figure 5:
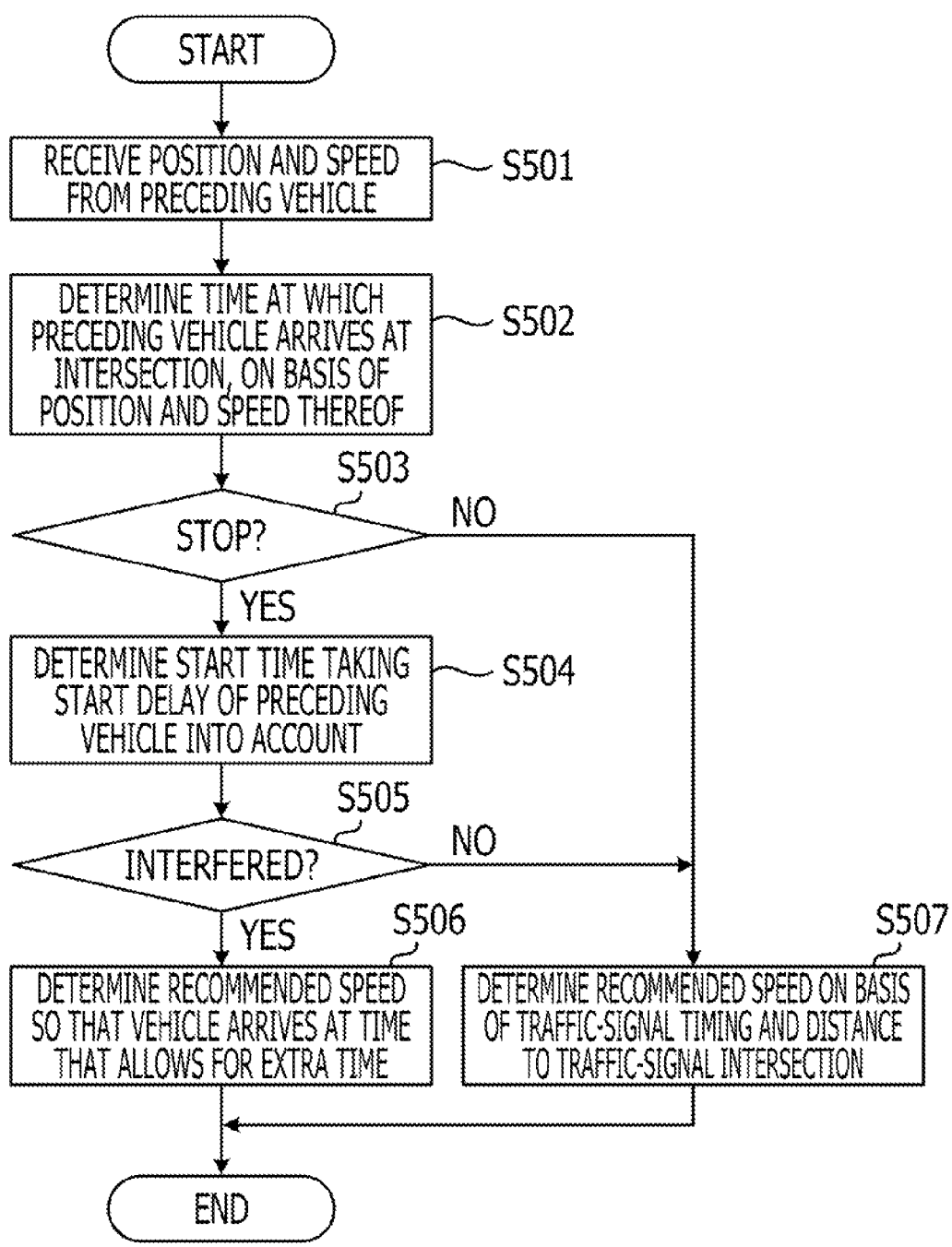
FIG. 5 is an example flowchart of a method of determining a recommended speed according to a second embodiment.

FIG. 5 is a flowchart illustrating a method for deterring a recommended speed in the second embodiment.

In operation S501, the receiving unit 12 receives other-vehicle information including information regarding the position and speed of a vehicle travelling ahead (the vehicle may hereinafter be referred to as a "preceding vehicle").

As in the first embodiment, the receiving unit 12 receives the other-vehicle information from the preceding vehicle via the wireless transmitting/receiving unit based on IEEE 802.11p or DSRC or the other-vehicle information transmitted via the base stations.

In operation S502, the determining unit 14 determines time at which the preceding vehicle arrives at the intersection, on the basis of the received information regarding the position and speed of the preceding vehicle.

In operation S503, the determining unit 14 determines whether or not the preceding vehicle stops at the red signal at the intersection located ahead of the host vehicle, on the basis of the time at which the preceding vehicle stops at the intersection and the traffic-signal change timings stored in the traffic-signal-information storage unit 20.

When the determining unit 14 determines that the preceding vehicle arrives at the intersection within the period in which the yellow and red signals at the intersection are turned on, the process proceeds to operation S504. Otherwise, the process proceeds to operation S507.

In operation S504, the determining unit 14 determines the start time of the preceding vehicle, the start time taking a delay of the start at the intersection into account.

In this case, the determining unit 14 determines a time at which the preceding vehicle starts moving at the intersection, considering a start delay from when the green signal is turned on until the preceding vehicle starts moving. The start delay time may also be determined using a calculation formula or a table created based on data statistically collected on the basis of, for example, the number of vehicles stopping ahead of the preceding vehicle and a time for drivers to start the vehicles from when the green signal is turned on or a preceding vehicle starts moving.

In operation S505, by comparing the determined preceding-vehicle start time and the time at which the host vehicle arrives at the intersection, the determining unit 14 and determines whether or not the other vehicle becomes an obstacle, i.e., whether or not the travel of the host vehicle is interfered with by the other vehicle, when the host vehicle travels at the current speed.

When the determining unit 14 determines that the host vehicle is interfered with by the other vehicle when the host vehicle travels at the current speed, the process proceeds to operation S506. Otherwise, the process proceeds to operation S507.

In operation S506, the calculating unit 16 determines a recommended speed so that it allows for an arrival avoidance time in which the time when the host vehicle arrives at the intersection is not interfered with by the time when the preceding vehicle starts moving.

In operation S507, the calculating unit 16 determines a recommended speed in accordance with the distance to the intersection and the traffic-signal light change timing held by the traffic-signal-information storage unit 20.

Figure 6:
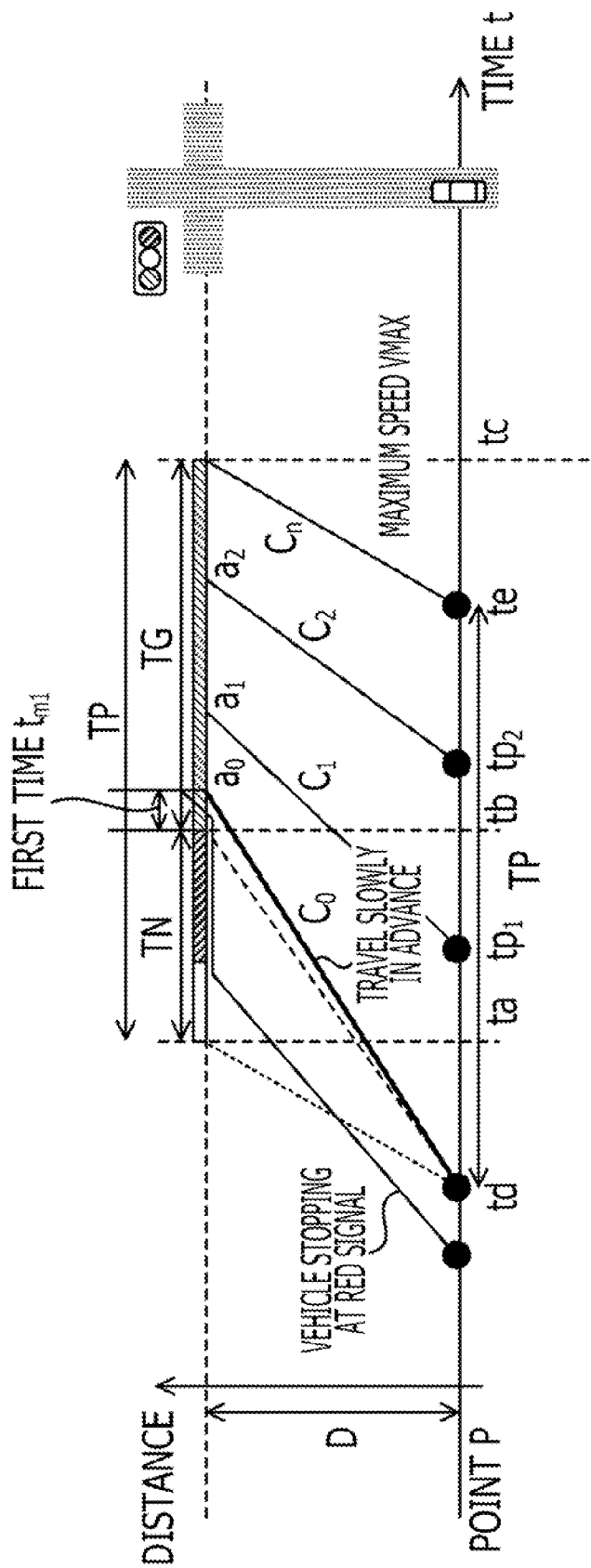
FIG. 6 is a diagram of an example of determining the recommended speed according to the second embodiment.

FIG. 6 is a diagram illustrating a method for determining a recommended speed in the second embodiment.

While a case in which another vehicle ahead of the host vehicle travels straight at the intersection has been discussed in the first embodiment described above, the second embodiment is directed to a case in which another vehicle traveling ahead stops at the intersection.

In the second embodiment, when the preceding vehicle travels straight without stopping at the intersection located ahead of the host vehicle, the recommended time $topt'_i$ determined in the first embodiment may be used as a recommended time $Tstraight_i$.

In contrast, when the preceding vehicle stops at the intersection to interfere with the travel of the host vehicle, the recommended time of the host vehicle may be preset to be longer to reduce the recommended speed, considering a first time (a start delay time) from when the green light is turned on until the preceding vehicle starts moving.

As illustrated in FIG. 6, considering the start delay time of the preceding vehicle, the calculating unit 16 determines that time $a_0$ at which the vehicle passing through the point P at the time td arrives at the intersection becomes an arrival time that is later than the time tb by a time $t_{m1}$.

The recommended time $topt'_0$ in this case may be expressed by addition of the recommended time $Tstraight_0$ for straight travel and the first time $t_{m1}$. The first time $t_{m1}$ may be determined based on the number of vehicles stopping at the red signal at the intersection.

In FIG. 6, times $a_1$ to $a_{n-1}$ at which vehicles $C_1$ to $C_{n-1}$ located between the $C_1$ that passes through the point P at time td and the vehicle $C_n$ that passes through the point P at time to arrive at the intersection may be expressed as times obtained by dividing times $a_0$ to tc by the ratios of $tp_1-td$, $tp_2-tp_1, \ldots,$ and $tp_n-tp_{n-1}$.

In the second embodiment, when another vehicle travelling ahead of the host vehicle stops at an intersection located ahead of the host vehicle and the determining unit 14 determines that the travel of the host vehicle is interfered with by another vehicle when the host vehicle travels at the current speed, the calculating unit 16 sets a lower recommended speed, considering the first time $t_{m1}$ based on the start delay or the like. That is, upon determining that the travel of the host vehicle is interfered with by another vehicle when the host vehicle travels at the current speed, the drive assist apparatus 10 determines a recommended speed on the basis of the current host-vehicle information, the road information, the traffic-signal change timing, and the arrival delay time for avoiding an obstacle caused by another vehicle. With this arrangement, since a recommended speed at which a speed change may be reduced may be determined based on the travel state of another vehicle, it is possible to help prevent an occurrence of a traffic accident and it is also possible to relieve traffic congestion. In addition, since a change in the speed of a vehicle may be reduced or prevented, the amount of fuel consumed may be reduced.

A drive assist apparatus 10 according to a third embodiment will be described below with reference to the accompanying drawings.

Figure 7:
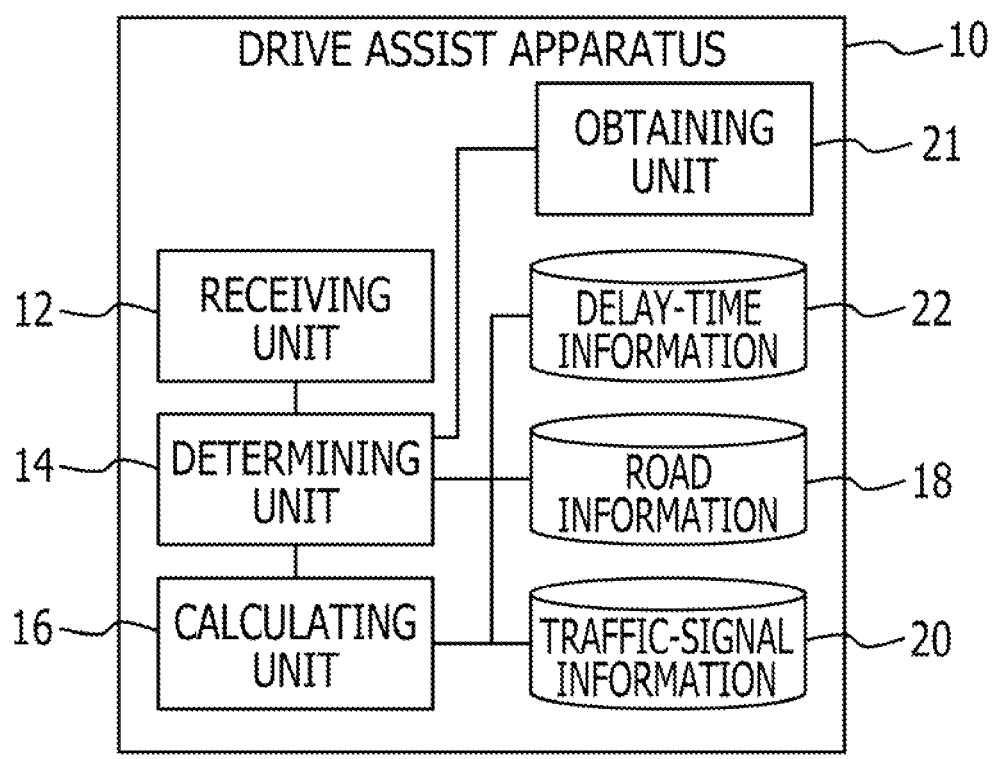
FIG. 7 is a functional block diagram of an example of a third embodiment of a drive assist apparatus.

FIG. 7 is a block diagram illustrating one example of the configuration of a drive assist apparatus 10 according to a third embodiment.

The drive assist apparatus 10 according to the third embodiment includes a receiving unit 12, a determining unit 14, a calculating unit 16, a road-information storage unit 18, a traffic-signal-information storage unit 20, and an obtaining unit 21, as in the drive assist apparatus according to the first embodiment described above. The drive assist apparatus 10 according to the third embodiment further includes a delay-time-information storage unit 22 storing delay time information.

The delay-time-information storage unit 22 serves as a storing unit that stores information of a second time for a vehicle to complete a right turn or left turn at an intersection.

The time for a vehicle to complete a left turn at an intersection may be the total of a delay time involved in a speed reduction for the left turn, a time from when a traffic signal for straight traffic in an opposing lane changes from the yellow signal to the red signal, and a time from when the traffic signal changes until the vehicle starts moving. The time from when the traffic-signal change until the vehicle starts moving is related to how many vehicles are waiting ahead of the vehicle to make left turns.

A time for the vehicle to complete a right turn at the intersection may be the total of a delay time involved in a speed reduction for the right turn and the a waiting time involved in crossing of pedestrians and/or two-wheel vehicles.

The second time for the vehicle to complete a right turn or left turn at the intersection is held by the delay-time-information storage unit 22 as a numeric value resulting from measurement or an aggregation value resulting from simulation or the like.

The receiving unit 12 receives other-vehicle information including right-and-left-information indicating whether another vehicle traveling ahead of the host vehicle is making a right turn or left turn at the intersection located ahead of the host vehicle.

The determining unit 14 refers to the second -time information, held by the delay-time-information storage unit 22, on the basis of the right-and-left-turn information included in the other-vehicle information, and determines whether or not the travel of the host vehicle is interfered with.

The calculating unit 16 determines a recommended speed so that a speed change due to influences of other vehicles and the traffic signals at the intersection is reduced, on the basis of the current local-vehicle information, the road information held by the road-information storage unit 18, the traffic-signal change timing held by the traffic-signal-information storage unit 20, and the other-vehicle information.

When the determining unit 14 determines that the right turn or left turn of another vehicle travelling ahead of the host vehicle causes the other vehicle to become an obstacle, e.g., causes the other vehicle to interfere with the travel of the host vehicle, when the host vehicle travels at the current speed, the calculating unit 16 determines a recommended speed on the basis of the current host-vehicle information, the road information held by the road-information storage unit 18, the traffic-signal change timing held by the traffic-signal-information storage unit 20, and the second time held by the delay-time-information storage unit 22.

Figure 8:
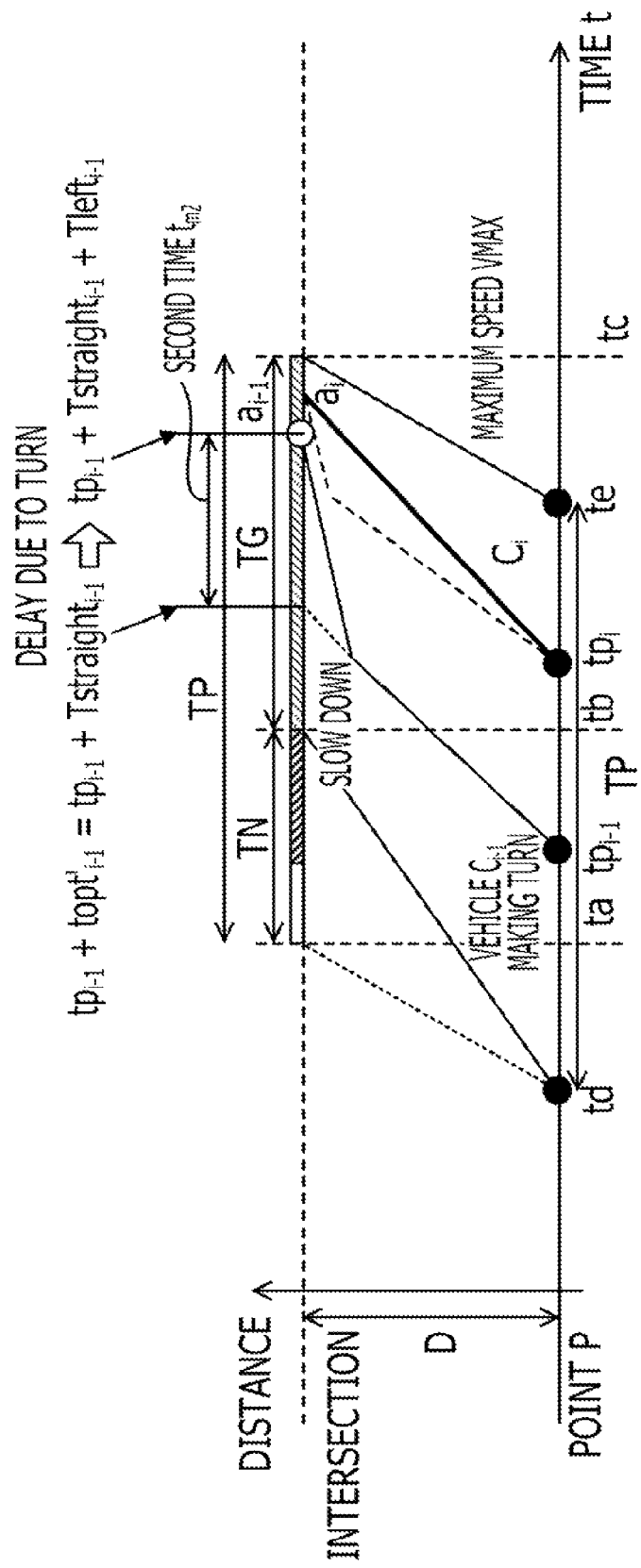
FIG. 8 is a diagram of an example of determining a recommended speed according to the third embodiment.

FIG. 8 is a diagram illustrating a method for determining a recommended speed when a right turn or left turn of another vehicle traveling ahead of the host vehicle causes the other vehicle to become an obstacle when the host vehicle travels at the current speed.

Although the second embodiment is directed to a case in which another vehicle traveling ahead stops at an intersection, the third embodiment is directed to a case in which another vehicle traveling ahead makes a right or left turn at an intersection.

In the third embodiment, when the preceding vehicle makes a turn and another vehicle does not become an obstacle when the host vehicle travels at the current speed, the recommended time topt) determined in the first embodiment may be used as a recommended time $\text{Tstraight}_i$.

In contrast, when the preceding vehicle makes a turn at an intersection and another vehicle becomes an obstacle when the host vehicle travels at the current speed, a time of the host vehicle may be preset to be longer to reduce the recommended speed, considering the second time for the turn of the preceding vehicle.

First, a description is given of a case in which, when a vehicle $C_i$ that passes through a point P at time $t_{pi}$ travels at the current speed, a vehicle $C_{i-1}$ that passed through the point P at time $tp_{i-1}$ and that is travelling ahead slows down for making a turn and thus becomes an obstacle. The time at which the vehicle $C_{i-1}$ arrives at the intersection is given as the total of the time $tp_{i-1}$ at which the vehicle $C_{i-1}$ passed through the point P and a recommended time $\text{topt'}_{i-1}$, and the total is also obtained by adding a recommended time $\text{Tstraight}_{i-1}$ for straight travel to the time $tp_{i-1}$ at which the vehicle $C_{i-1}$ passed through the point P. Delay time information resulting from the turn is further added to the value of that addition. When the delay time information involved in the turn is used as a second time $\text{Tleft}_{i-1}$ stored in the delay-time-information storage unit 22, the time $a_{i-1}$ at which the vehicle $C_{i-1}$ arrives at the intersection is expressed by $tp_{i-1}+\text{Tstraight}_{i-1}+\text{Tleft}_{i-1}$.

Considering such a delay time involved in the turn of the vehicle $C_{i-1}$, the recommended time $\text{topt'}_i$ is determined so that the time at which the vehicle $C_i$ arrives at the intersection satisfies $tp_i+\text{topt'}_i=a_i$.

As described above, for calculating the recommended time by using a mathematical expression, the arrival time $a_i$ of $C_i$ may be set to time obtained by dividing a point of time between time $a_{i-1}$ to time tc by a ratio $tp_i-tp_{i-1}:te-tp_i$.

Figure 9:
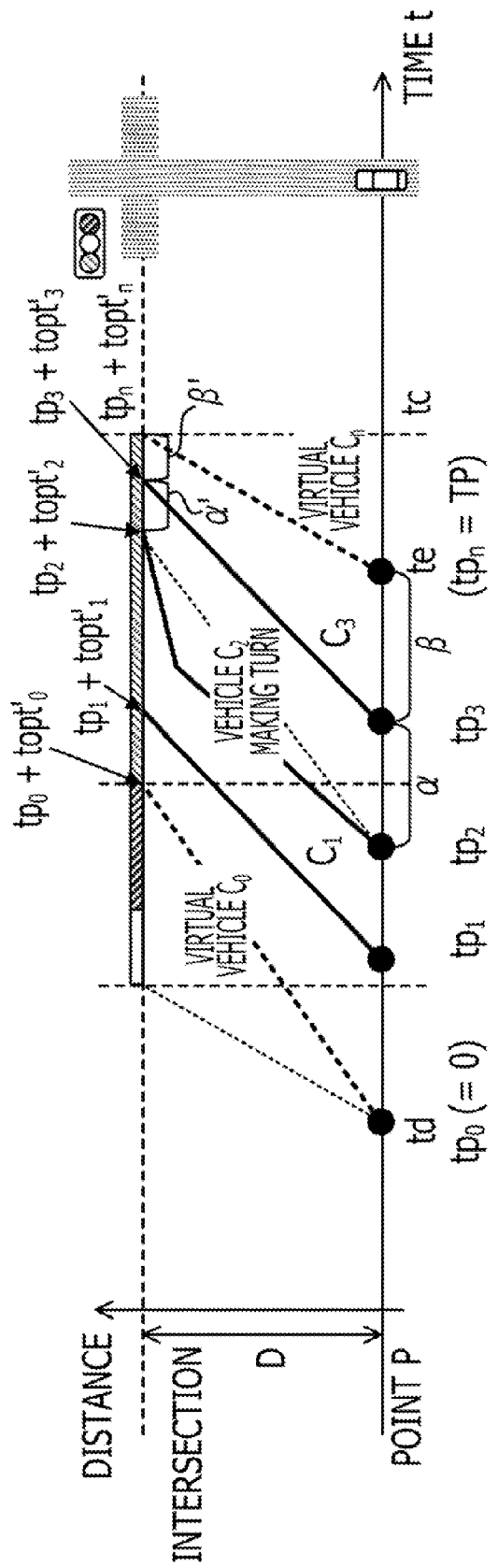
FIG. 9 is a diagram of an example of determining a recommended speed according to the third embodiment.

FIG. 9 is a diagram illustrating a specific example for determining a recommended speed when a vehicle is making a turn.

The example in FIG. 9 is directed to a case in which vehicles $C_1$ to $C_3$ that pass through a point P at respective times $tp_1$ to $tp_3$ are travelling between a virtual vehicle $C_0$ that passes through the point P at time td ($tp_0=0$) and a virtual vehicle $C_n$ that passes through the point P at time te ($tp_n=TP$) and the vehicle $C_2$ makes a turn at an intersection.

With respect to the vehicle $C_1$ travelling ahead of the vehicle $C_2$ that makes a turn at the intersection, a recommended time may be determined as in the case of the straight travel in the embodiment described above.

With respect to the vehicle $C_2$ that makes a turn at the intersection, a recommended time obtained by adding the second time, which represents the time for the turn, is determined, and time at which the vehicle $C_2$ arrives at the intersection is expressed as $tp_2+\text{topt'}_2$.

With respect to the vehicle $C_3$ whose travel is interfered with by the vehicle $C_2$, a recommended time considering the time $tp_2+\text{topt'}_2$ at which the vehicle $C_2$ arrives at the intersection is determined, so that the time at which the vehicle $C_3$ arrives at the intersection is expressed as $tp_3+\text{topt'}_3$.

The calculating unit 16 determines the recommended time of the vehicle $C_3$ so that the ratio of the time $\alpha'$ from the time at which the vehicle $C_2$ arrives at the intersection until the time at which the vehicle $C_3$ arrives at the intersection to the time β' from the time at which the vehicle $C_3$ arrives at the intersection until the time tc at which the green signal is turned off is substantially equal to the ratio of the time α from the time $tp_2$ at which the vehicle $C_2$ passes through the point P until the time $tp_3$ at which the vehicle $C_3$ passes through the point P to the time β from the time $tp_3$ at which the vehicle $C_3$ passes through the point P until the time te.

When a left-turn-only lane is designated at an intersection, a vehicle behind may travel straight regardless of a vehicle that is making a left turn. In such a case, after the traffic signal for vehicles traveling straight in opposing lanes changes to the red signal, the green signal for vehicles in the left-turn-only lane is turned on in many cases. In such cases, after the preceding vehicle completes the left turn, the traffic signal for the vehicles travelling straight has turned to the red signal. Thus, when a left-turn-only lane is designated at an intersection, a recommended time as described above may not be usable.

However, when a left-turn lane is not designated and a traffic signal for vehicles making left turns only does not exist, a recommended time and a recommended speed as described above may be determined using the second time for left turn.

As described above, when another vehicle that is making a right or left turn is present ahead of the host vehicle and it is determined that the other vehicle becomes an obstacle to the travel of the host vehicle when the host vehicle travels at the current speed, the drive assist apparatus 10 determines a recommended speed on the basis of the current host-vehicle information, the road information, the traffic-signal change timing, and the delay time. With this arrangement, since a recommended speed at which a speed change may be reduced or prevented may be determined based on the travel state of another vehicle, it is possible to help prevent an occurrence of a traffic accident and it is also possible to relieve traffic congestion. In addition, since a change in the speed of a vehicle may be reduced or prevented, the amount of fuel consumed may be reduced.

A drive assist apparatus according to a fourth embodiment will be described below with reference to the accompanying drawings. A drive assist apparatus 10 according to a fourth embodiment may include functional units that are substantially the same as those in the third embodiment. The delay-time-information storage unit 22 holds information of a third time for a vehicle to reach its normal travel speed when merging into a road from a facility along the road or from a side road. The receiving unit 12 receives other-vehicle information including merge information indicating that another vehicle is merging into traffic ahead of the host vehicle. On the basis of the merge information included in the other-vehicle information, the determining unit 14 refers to the third-time information held by the delay-time-information storage unit 22 and determines whether or not travel of the host vehicle is interfered with.

Figure 10:
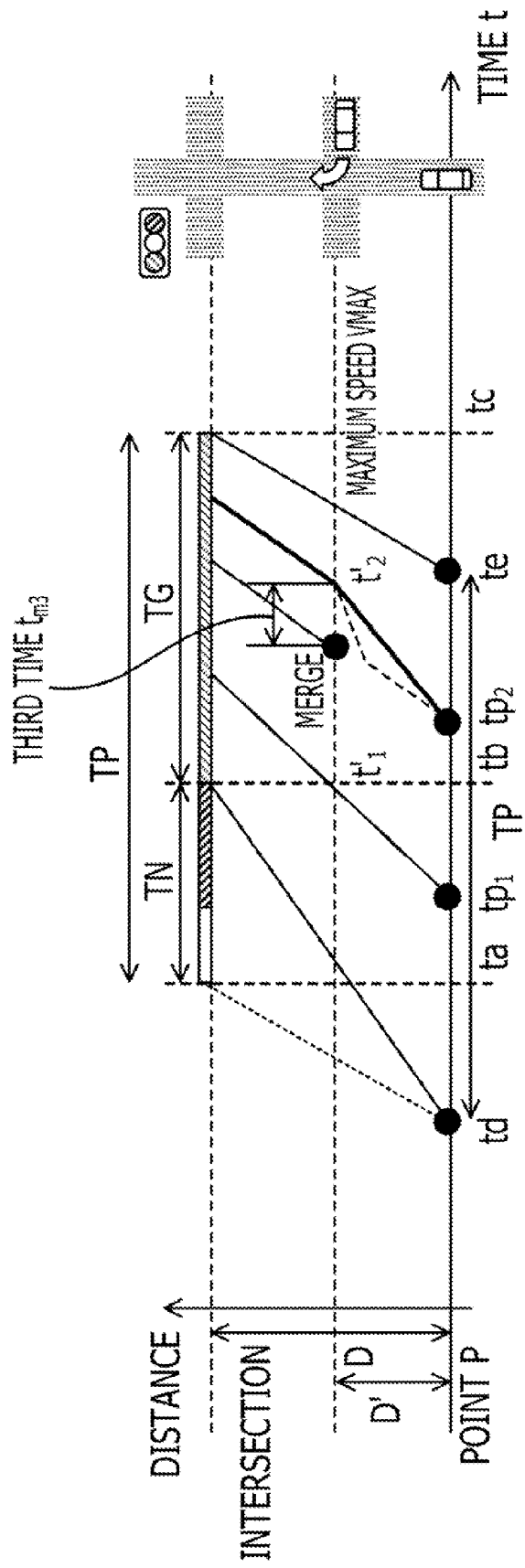
FIG. 10 is a diagram of an example of determining a recommended speed according to a fourth embodiment.

FIG. 10 is a diagram illustrating a method for determining a recommended speed when another vehicle is merging from a side road located ahead in the travel direction of the host vehicle.

In FIG. 10, D indicates the distance between a point P and an intersection and D' indicates the distance between the point P and the side road.

Using the recommended time $\text{Tstraight}_i$ for straight travel, the time for the vehicle that passes through the point P at time $tp_i$ to reach the side road may be expressed by $(D'/D)\text{Tstraight}_i$. Thus, the time $t'_i$ at which the vehicle reaches the side road may be expressed by $t'_i = tp_i + (D'/D)\text{Tstraight}_i$.

The determining unit 14 determines whether or not any vehicle merges from the side road at time $t'_i$. For the determination, for example, car-navigation-system route information indicating that a vehicle is merging from the side road into traffic ahead of the host vehicle may be received as the other-vehicle travel information, through communication with other vehicles in the vicinity of the host vehicle. Other-vehicle information indicating that another vehicle is merging from the side road into traffic ahead of the host vehicle may be received from a center, which manages traffic information, via a base station installed in the vicinity of the road. In addition, other-vehicle information indicating that a vehicle is merging from the side road may be obtained through communication with a vehicle that is traveling ahead of the host vehicle.

When the receiving unit 12 receives the other-vehicle information including the information indicating that another vehicle is merging from the side road, the determining unit 14 determines whether or not the merging of the other vehicle interferes with the travel of the host vehicle.

When the determining unit 14 determines that the merging vehicle does not become an obstacle when the host vehicle travels at the current speed, the calculating unit 16 determines a recommended time and a recommended speed by using a method that is substantially similar to the method in the first embodiment.

When the determining unit 14 determines that the merging vehicle become an obstacle when the host vehicle travels at the current speed, the calculating unit 16 refers to the third time (which is the time information of delay due to the merging vehicle) held by the delay-time-information storage unit 22 and determines a recommended time and a recommended speed on the basis of the third time.

The third time may be statistically obtained time information held by the delay-time-information storage unit 22 as a fixed value. The merging of another vehicle may include not only merging from a side road but also entering a road from a parking lot of a facility along the road. Preferably, individual values for a merging side road or a facility along a road may be held by the delay-time-information storage unit 22.

When another vehicle merges from a side road located ahead of the vehicle that passed through the point P at time $tp_2$, as illustrated in FIG. 10, the recommended time is determined so that time $t'_2$ at which the merging vehicle reaches the side road satisfies $t'_2 = tp_2 + (D'/D)\text{Tstraight}_2 + t_{m3}$, which takes the second time $tm_3$ into account.

The recommended time and the recommended speed from the side road to the intersection may be determined as in the first to third embodiments described above.

As described above, even for a side road for which information regarding traffic-signal change timing is not available, the drive assist apparatus 10 may determine a recommended time and a recommended speed such that a speed change does not occur, upon obtaining the other-vehicle information indicating that a vehicle is merging. This arrangement, therefore, may contribute to traffic safety. In addition, since a speed change may be reduced or prevented, the amount of fuel consumed may be reduced.

A drive assist apparatus 10 according to a fifth embodiment will be described below with reference to the accompanying drawings.

A drive assist apparatus 10 according to the fifth embodiment may include a processor that is substantially similar to the processor in a third embodiment.

The delay-time-information storage unit 22 holds information of a fourth time for a vehicle to complete entry into a facility along a road.

The fourth time may be statistically obtained time information held by the delay-time-information storage unit 22 as a fixed value. Preferably, individual values for the facility along the road or for the side road may be held by the delay-time-information storage unit 22.

The receiving unit 12 receives other-vehicle information including destination information indicating that the destination of another vehicle traveling ahead of the host vehicle is a facility along the road.

On the basis of the destination information included in the other-vehicle information, the determining unit 14 refers to the fourth-time information held by the delay-time-information storage unit 22 and determines whether or not the travel of the host vehicle is interfered with.

Figure 11:
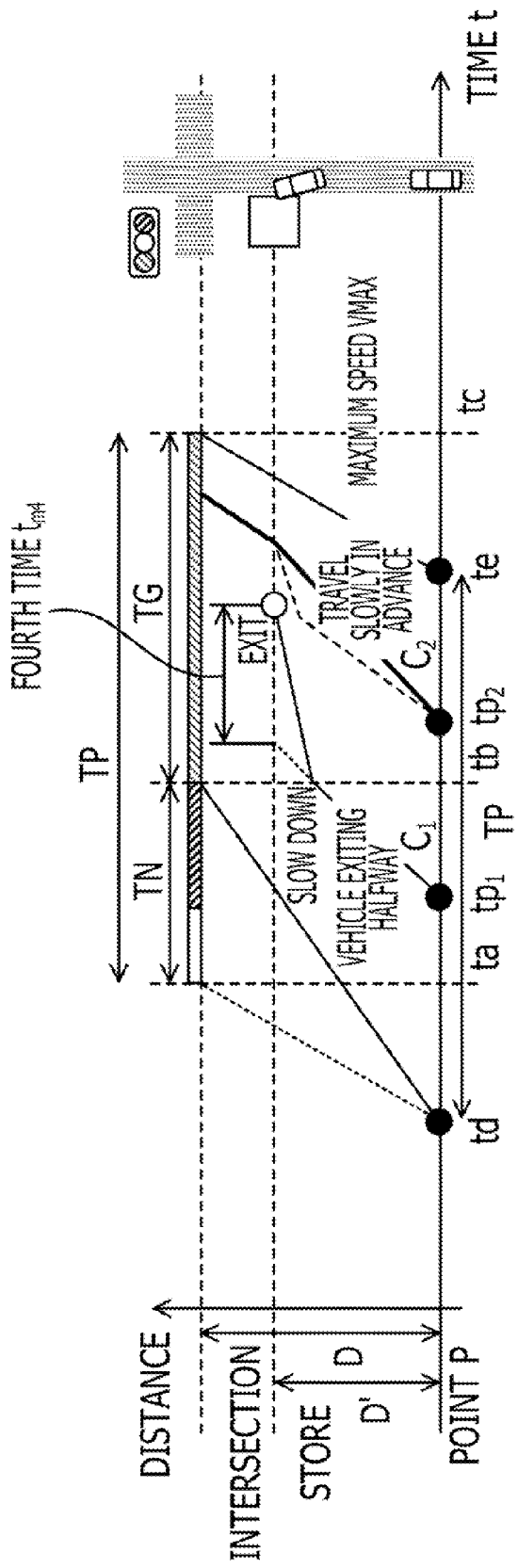
FIG. 11 is a diagram of an example of determining a recommended speed according to a fifth embodiment.

FIG. 11 is a diagram illustrating a method for the calculating unit 16 to determine a recommended speed when another vehicle travelling ahead of the host vehicle enters a facility along a road.

A description will be given of a case in which a store, a parking lot, and other facilities are located ahead of the host vehicle and vehicles may exit from the road on which the host vehicle is traveling. In FIG. 11, D indicates the distance between a point P and an intersection and D' indicates the distance between the point P and the facility.

It is assumed that the host vehicle is a vehicle $C_2$ that passes the point P at time $tp_2$ and another vehicle $C_1$ is travelling ahead of the vehicle $C_2$.

It is also assumed that the vehicles $C_1$ and $C_2$ are traveling on the basis of respective recommended times $Tstraight_1$ and $Tstraight_2$ for straight travel, as in the embodiment described above. Thus, the times at which the vehicles $C_1$ and $C_2$ arrive at the store are given by $t'_1 = tp_1 + (D'/D)Tstraight_1$ and $t'_2 = tp_2 + (D'/D)Tstraight_2$, respectively.

When the destination of the vehicle $C_1$ is the store, the vehicle $C_1$ slows down as it approaches the store and then exits the road. Since the vehicle $C_1$ slows down near the store, the arrival time is assumed to be delayed by a fourth time $t_{m4}$ relative to the time at which the vehicle $C_1$ reaches the location of the store if it travels based on the initially set recommended speed. In this case, the time $t'_1$ at which the vehicle $C_1$ arrives at the location of the store may be expressed by $t'_1 = tp_1 + (D'/D)Tstraight_1 + t_{m4}$.

When the drive assist apparatus 10 installed in the vehicle $C_2$ may know that the destination of the vehicle $C_1$ is the store, a recommended time and a recommended speed which take the fourth time $t_{m4}$ into account may be determined through determination as to whether or not the travel of the vehicle $C_1$ is interfered with.

For example, the information indicating that the destination of the vehicle $C_1$, may be, for example, route information of the car navigation system installed in the vehicle $C_1$ and may be obtained by the receiving unit 12 as other-vehicle information.

As in the embodiment described above, a recommended time and a recommended speed of the vehicle behind the vehicle $C_1$ that has exited toward the store may also be determined as in the above-described embodiment after the vehicle in question passes by the store.

According to the fifth embodiment described above, even in a case in which a vehicle exits to a facility along a road for which information regarding traffic-signal change timing is not available, a recommended time and a recommended speed may be determined such that a speed change does not occur, when the other-vehicle information indicating that the vehicle is exiting may be obtained from the vehicle route information or the like. This arrangement, therefore, may contribute to traffic safety. In addition, since a speed change may be reduced or prevented, the amount of fuel consumed may be reduced.

Although an example in which the road information, the traffic-signal information, and the vehicle travel information are stored in the drive assist apparatus 10 installed in the vehicle has been described in the above embodiments, the configuration is not limited thereto. A center connected for communication with a computer installed in the vehicle may manage the road information, the traffic-signal information, and the vehicle-travel information, held by the drive assist apparatus 10 in the above-described embodiments, and may transmit a recommended time and a recommended speed to a corresponding vehicle.

Figure 12:
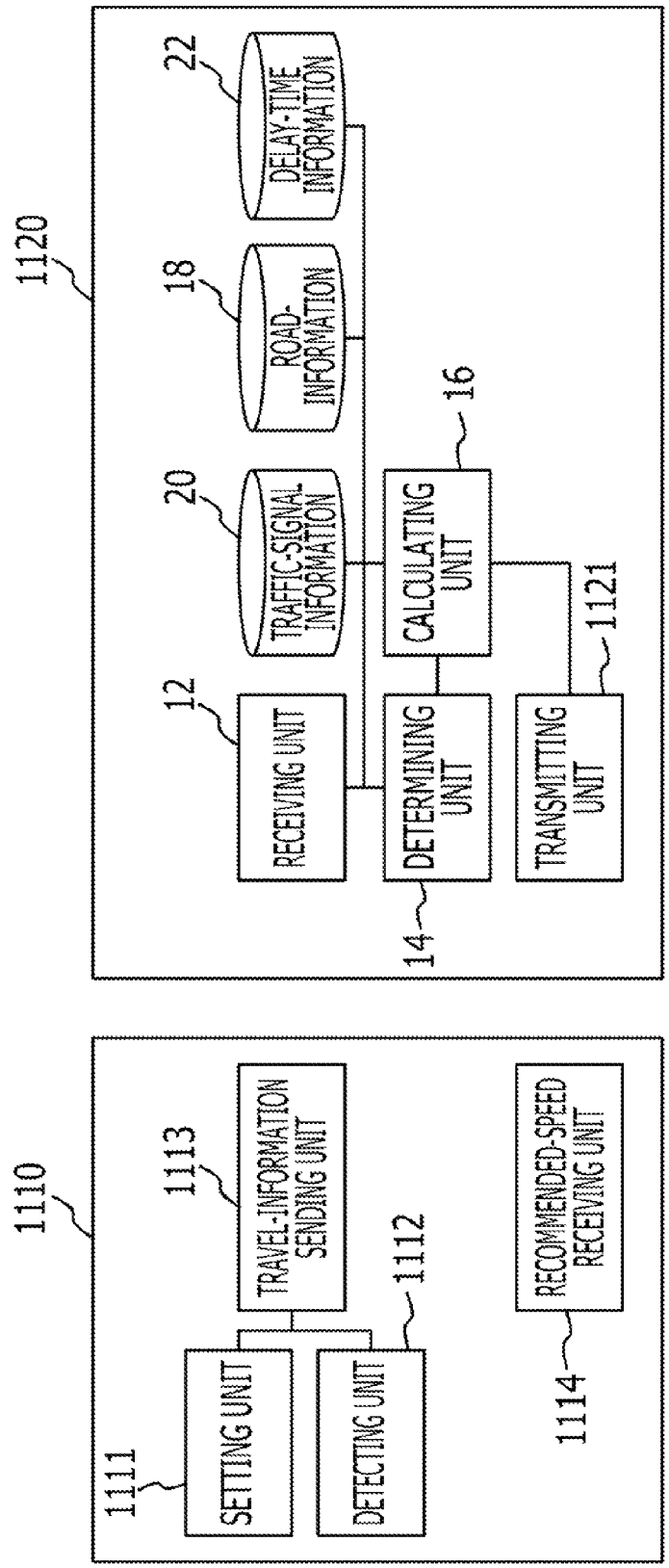
FIG. 12 is a functional block diagram of an example of a drive assist apparatus according to a sixth embodiment.

A sixth embodiment will be described below with reference to FIG. 12. FIG. 12 is a block diagram illustrating one example of a functional configuration when a computer at a center manages various types of information.

An in-vehicle unit 1110 is a computer installed in a vehicle and includes a setting unit 1111, a detecting unit 1112, a travel-information transmitting unit 1113, and a recommended-speed receiving unit 1114.

The setting unit 1111 serves as a processor for enabling the driver of the vehicle to set and store a destination and may be implemented by, for example, a car navigation system.

The detecting unit 1112 serves as a processor for detecting the current position information and the vehicle travel information, including the speed information, of the vehicle in which the in-vehicle unit 1110 is installed. One example of the position information is a current vehicle position obtained from the car navigation system or a GPS-equipped device. The detecting unit 1112 may also locate the current vehicle position through reception of radio waves from beacons installed in the vicinity of a road.

The travel-information transmitting unit 1113 serves as a processor for transmitting, to a center 1120, the route information set via the setting unit 1111 and the travel information detected by the detecting unit 1112.

The recommended-speed receiving unit 1114 serves as a processor for receiving a recommended time and a recommended speed transmitted from the center 1120.

The center 1120 may be a computer connected for communication with the in-vehicle unit 1110 through road-to-vehicle communication. The center 1120 includes a receiving unit 12, a determining unit 14, a calculating unit 16, a road-information storage unit 18, a traffic-signal-information storage unit 20, a delay-time-information storage unit 22, and a transmitting unit 1121.

The receiving unit 12 receives the route information, the vehicle travel information regarding the current position and speed, and so on transmitted from the travel-information transmitting unit 1113 of the vehicle via a base station installed in the vicinity of a road.

The receiving unit 12 may obtain, for example, states of traffic of pedestrians and two-wheel vehicles, as well as the vehicle travel information. When any pedestrian and/or two-wheel vehicle becomes an obstacle to travel of the vehicle, the center 1120 may determine a recommended speed that takes that factor into account. For example, the arrangement may also be such that a signal indicating detection of a moving object, such as a pedestrian and/or two-wheel vehicle, is obtained from an infrared sensor, a microwave moving-object detecting sensor, or the like installed in the vicinity of a road, so that the receiving unit 12 may receive the detection signal.

The determining unit 14, the calculating unit 16, the road-information storage unit 18, the traffic-signal-information storage unit 20, and the delay-time-information storage unit 22 have substantially the same functions as those in the above-described embodiments to determine a recommended time and a recommended speed of each vehicle.

The recommended time and the recommended speed determined by the calculating unit 16 are transmitted to the in-vehicle unit 1110 via the transmitting unit 1121.

The vehicle travel information and the information regarding the recommended speed are transmitted/received through radio communication between the center 1120 and the in-vehicle unit 1110 via a base station installed in the vicinity of a road.

A monitor and a speaker (which are not illustrated) may be coupled to the in-vehicle unit 1110. The recommended time and the recommended speed received by the recommended-speed receiving unit 1114 may be displayed on the monitor as image information and/or may be output via the speaker as sound. The monitor and the speaker may also be used for the car navigation system or may be coupled to the in-vehicle unit 1110 as its dedicated system. The recommended speed received by the recommended-speed receiving unit 1114 may also be used as setting speed information of a device for automatic vehicle-speed control, for example, for low-speed ACC (adaptive cruise control).

Setting for the setting unit 1111 may also be performed using a signal transmitted from the center 1120 to the in-vehicle unit 1110. The route information input to the setting unit 1111 may also be stored in a server (not illustrated) connected to the center 1120.

In addition to the traffic-signal change timing held by the traffic-signal-information storage unit 20, the center 1120 may receive a traffic-signal control signal transmitted from a traffic light and may detect traffic-signal change timing on the basis of the traffic-signal control signal. Although the period of change timing of a pedestrian-control light is irregular, the center 1120 may detect an accurate change timing by obtaining a traffic-signal control signal transmitted from the traffic light.

Since the center 1120 has the above-described functional units, it may accurately recognize information regarding current road states through reception of vehicle travel information from multiple in-vehicle units 1110. On the basis of the received information, the center 1120 may determine an appropriate travel speed for each vehicle.

With the recommended time and the recommended speed determined by the calculating unit 16, it is possible to reduce or prevent a change in the speed of each vehicle, leading to prevention of traffic accidents and relief of traffic congestion, and it is also possible to reduce the amount of fuel consumed.

In addition, since the center 1120 holds information to determine the recommended speed, the in-vehicle unit 1110 does not need to have a database for the traffic-signal information, the road information, the delay-time information, and so on. In addition, since the in-vehicle unit 1110 does not need to have a function for determining the presence/absence of travel interference and a function for determining a recommended speed, the in-vehicle unit 1110 may be simplified and may be reduced in cost.

In addition, through acquirement of changes in the traffic-signal information and the road information to update the traffic-signal information and the road information, the center 1120 may determine a recommended speed by using the latest information.

Telematics services are available to provide vehicles with services by utilizing mobile communications systems for mobile phones and so on. Such telematics services allow for traffic-information distribution, electronic-mail transmission/reception, and traffic-congestion information viewing, and so on through use of a mobile communications network.

Through use of such a system, the telematics center may determine recommended times and recommended speeds for travel of vehicles and may transmit the determined recommended times and recommended speeds to the respective vehicles.

Figure 13:
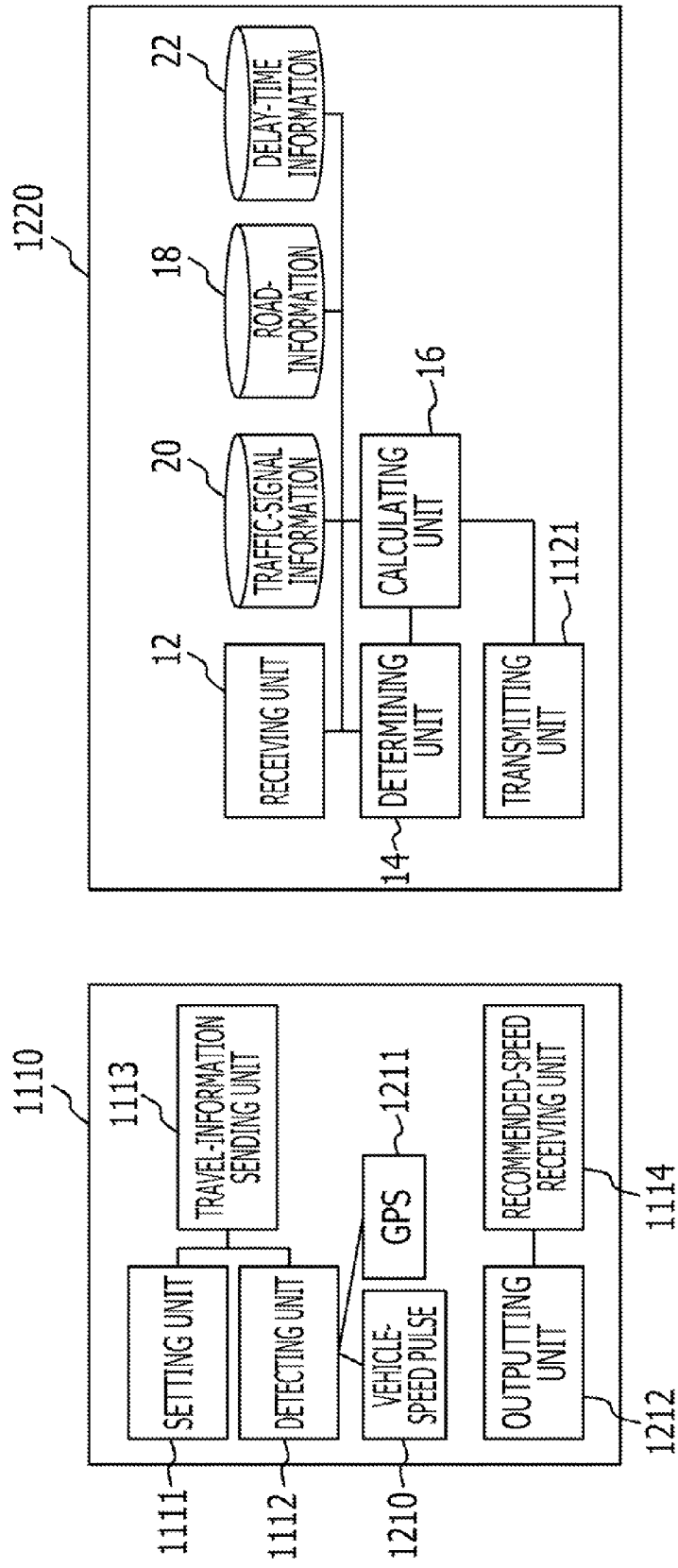
FIG. 13 is a functional block diagram of an example of a drive assist apparatus according to a seventh embodiment.

A seventh embodiment will be described below with reference to FIG. 13. FIG. 13 is a block diagram illustrating one example of a functional configuration when a telematics center manages various types of information.

The in-vehicle unit 1110 includes a vehicle-speed pulse detecting unit 1210 and a GPS receiving unit 1211 in addition to the setting unit 1111, the detecting unit 1112, the travel-information transmitting unit 1113, and the recommended-speed receiving unit 1114 in the sixth embodiment.

The setting unit 1111 and the detecting unit 1112 have substantially the same configurations as those in the sixth embodiment.

In addition to the functions illustrated in the sixth embodiment, the detecting unit 1112 may detect a vehicle speed on the basis of a signal sent from the vehicle-speed pulse detecting unit 1210 and also may detect vehicle-position information on the basis of a signal sent from the GPS receiving unit 1211.

The travel-information transmitting unit 1113 transmits, to a telematics center 1220, the route information set via the setting unit 1111 and the travel information detected by the detecting unit 1112.

The recommended-speed receiving unit 1114 receives a recommended time and a recommended speed transmitted from the telematics center 1220.

The telematics center 1220 may be a computer connected for communication with the in-vehicle unit 1110 through a mobile communications network. The telematics center 1220 includes a receiving unit 12, a determining unit 14, a calculating unit 16, a road-information storage unit 18, a traffic-signal-information storage unit 20, a delay-time-information storage unit 22, and a transmitting unit 1121.

The receiving unit 12 receives the route information, the vehicle travel information regarding the current position and speed, and so on transmitted from each vehicle via a mobile communications system, including the mobile phone network and so on.

The determining unit 14, the calculating unit 16, the road-information storage unit 18, the traffic-signal-information storage unit 20, and the delay-time-information storage unit 22 have substantially the same functions as those in the above-described embodiments to determine a recommended time and a recommended speed of each vehicle.

The recommended time and the recommended speed determined by the calculating unit 16 are transmitted to the in-vehicle unit 1110 via the transmitting unit 1121. The vehicle travel information and the recommended speed transmitted/received between the in-vehicle unit 1110 and the telematics center 1220 is performed using a mobile communications system, such as a mobile phone network.

A monitor and a speaker (which are not illustrated) may be coupled to the in-vehicle unit 1110. The recommended time and the recommended speed received by the recommended-speed receiving unit 1114 may be displayed on the monitor as image information and/or may be output via the speaker as sound. The monitor and the speaker may also be used for the car navigation system or may be coupled to the in-vehicle unit 1110 as its dedicated system. The monitor or speaker is an examples of outputting unit 1212.

Setting for the setting unit 1111 may also be performed using a signal transmitted from the telematics center 1220 to the in-vehicle unit 1110. The route information input to the setting unit 1111 may also be stored in a server (not illustrated) connected to the telematics center 1220.

Since the telematics center 1220 has the above-described functional units, it may accurately recognize information regarding current road states through reception of vehicle travel information from multiple in-vehicle units 1110. On the basis of the received information, the telematics center 1220 may determine an appropriate travel speed for each vehicle.

With the recommended time and the recommended speed determined by the calculating unit 16, it is possible to reduce or prevent a change in the speed of each vehicle, leading to the reduction or prevention of traffic accidents and relief of traffic congestion, and it is also possible to reduce the amount of fuel consumed.

In addition, since the center 1120 holds the information needed to determine the recommended speed, the in-vehicle unit 1110 of each vehicle does not need to have a database for the traffic-signal information, the road information, the delay-time information, and so on. In addition, since the in-vehicle unit 1110 does not need to have a function for determining the presence/absence of travel interference and a function for determining a recommended speed, the in-vehicle unit 1110 may be simplified and may be reduced in cost.

In addition, through acquirement of changes in the traffic-signal information and the road information to update the traffic-signal information and the road information, the telematics center 1220 may determine a recommended speed by using the latest information.

Since some telematics systems are already up and running, the telematics center 1220 may use such systems to aggregate travel information of vehicles and may determine recommended speeds and issue instructions.

The embodiments described above may also be combined with each other within a scope in which no contradiction occurs.

In the embodiments described above, each computer may have, as hardware, a CPU (central processing unit), a ROM (read only memory), a RAM (random access memory), and an input/output unit. A program that the CPU uses for control is recorded in the ROM. The CPU reads the program recorded in the ROM and performs processing according to the read program. Data that the CPU uses for computation and data resulting from the computation are stored in the RAM. The input/output unit receives an operation input performed by a user and outputs the operation input to the CPU. The input/output unit outputs an instruction signal, output from the CPU, to a network interface. The network interface transmits the instruction signal, output from the input/output unit, to another computer through a network. The functional blocks illustrated in FIGS. 1, 7, 12, and 13 are realized by processing of the CPU that executes software. Part or all of the processing may be realized by hardware, such as logic circuits. Additionally, the processing of the program may be partially executed by an operating system (OS).

The embodiments may be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal. The media described above may be non-transitory media.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A drive assist apparatus comprising:
   a road-information storage unit to store road information including positions of intersections on a road;
   a traffic-signal information storage unit to store information regarding a presence/absence of a signal light at each of the intersections and information regarding change timing of a traffic signal of the signal light;
   a receiving unit to receive other-vehicle information including information regarding a position and a speed of an other vehicle traveling ahead of a host vehicle;
   an obtaining unit to obtain host-vehicle information including a speed of the host vehicle;
   a determining unit to determine whether the other vehicle becomes an obstacle to travel of the host vehicle, by comparing the other-vehicle information and the host-vehicle information; and
   a calculating unit to calculate a recommended speed on a basis of the host-vehicle information, the road information, and information regarding the traffic-signal change timing when the determining unit determines that the other vehicle does not become an obstacle to the travel of the host vehicle, and that calculates the recommended speed on a basis of the host-vehicle information, the road information, the information regarding the traffic-signal change timing, and an arrival delay time for avoiding an obstacle caused by the other vehicle when the determining unit determines that the other vehicle becomes the obstacle to the travel of the host vehicle.

2. The drive assist apparatus according to claim 1, wherein the determining unit determines a first time from when the other vehicle stops at a red signal ahead of the host vehicle until the other vehicle starts moving at a next green signal, on a basis of the other-vehicle information received from the other vehicle and the information regarding the traffic-signal change timing at the intersection located ahead of the host vehicle, and that determines whether the other vehicle becomes an obstacle to the travel of the host vehicle, on a basis of the first time.

3. The drive assist apparatus according to claim 1, further comprising:
   a delay-time-information storage unit to store information of a second time for the other vehicle to complete a right turn or a left turn at the intersection;

wherein the receiving unit receives other-vehicle information including right-and-left turn information indicating that the other vehicle makes a right turn or a left turn at the intersection located ahead of the host vehicle, and the determining unit refers to the second time information stored in the delay-time-information storage unit on a basis of the right-and-left turn information included in the other-vehicle information, and that determines whether the other vehicle becomes an obstacle to the travel of the host vehicle on a basis of the second time information.

4. The drive assist apparatus according to claim 1, further comprising:

a delay-time-information storage unit to store information of a third time for a vehicle to reach a normal travel speed when the vehicle merges into the road from a facility along the road or from a side road;

wherein the receiving unit receives other-vehicle information including merge information indicating that another vehicle merges ahead of the host vehicle, and the determining unit refers to the third time information stored in the delay-time-information storage unit, on a basis of the merge information included in the other-vehicle information, and determines whether the other vehicle that merges ahead of the host vehicle becomes an obstacle to the travel of the host vehicle, on a basis of the third time.

5. The drive assist apparatus according to claim 1, further comprising:

a delay-time-information storage unit to store information of a fourth time for a vehicle to complete entry into a facility along the road;

wherein the receiving unit receives other-vehicle information including destination information indicating that a destination of the other vehicle is the facility along the road, and the determining unit refers to the fourth time information stored in the delay-time-information storage unit, on a basis of the destination information included in the other-vehicle information, and determines whether the other vehicle becomes an obstacle to the travel of the host vehicle, on a basis of the fourth time.

6. A non-transitory computer-readable medium for recording a program allowing a computer to execute:

receiving other-vehicle information including information regarding a position and a speed of an other vehicle traveling ahead of a host vehicle;

obtaining host-vehicle information including a speed of the host vehicle;

determining whether the other vehicle becomes an obstacle to travel of the host vehicle, by comparing the other-vehicle information and the host-vehicle information;

calculating a recommended speed on a basis of the host-vehicle information, road information including a distance between intersections, and information regarding change timing of a traffic signals at the intersection, when it is determined that the other vehicle does not become an obstacle to the travel of the host vehicle, and calculating the recommended speed on a basis of the host-vehicle information, the road information, the information regarding the change timing at the traffic signals, and an arrival delay time for avoiding an obstacle caused by the other vehicle, when it is determined that the other vehicle becomes the obstacle to the travel of the host vehicle; and outputting the recommended speed calculated by the calculating.

7. The non-transitory computer-readable medium according to claim 6, wherein, in the determining, a first time from when the other vehicle stops at a red signal ahead of the host vehicle until the other vehicle starts moving at a next green signal is determined on a basis of the other-vehicle information received from the other vehicle and the information regarding the change timing of the traffic signal at the intersection located ahead of the host vehicle, and whether the other vehicle becomes an obstacle to the travel of the host vehicle is determined on a basis of the first time.

8. The non-transitory computer-readable medium according to claim 6, wherein, in the receiving, other-vehicle information including right-and-left turn information indicating that the other vehicle makes a right turn or a left turn at the intersection located ahead of the host vehicle; and in the determining, information of a second time for the other vehicle to complete the right turn or the left turn at the intersection, the second time information being stored in a delay-time information storage unit, is referred to on a basis of the right-and-left turn information included in the other-vehicle information, and whether the other vehicle becomes an obstacle to the travel of the host vehicle is determined on a basis of the second time information.

9. The non-transitory computer-readable medium according to claim 6, wherein, in the receiving, other-vehicle information including merge information indicating that another vehicle merges ahead of the host vehicle is received, and in the determining, information of a third time for a vehicle to reach a normal travel speed when the vehicle merges into a road from a facility along the road or from a side road, the third time information being stored in a delay-time information storage unit, is referred to on a basis of the merge information included in the other-vehicle information, and whether the other vehicle that merges ahead of the host vehicle becomes an obstacle to the travel of the host vehicle is determined on a basis of the third time.

10. The non-transitory computer-readable medium according to claim 6, wherein, in the receiving, other-vehicle information including destination information indicating that a destination of the other vehicle is a facility along a road is received; and in the determining, information of a fourth time for a vehicle to complete entry into the facility along the road, the fourth time information being stored in a delay-time information storage unit, is referred to on a basis of the destination information included in the other-vehicle information, and whether the other vehicle becomes an obstacle to the travel of the host vehicle is determined on a basis of the fourth time.

11. A method of drive assist, the method comprising:

receiving vehicle information from each of a first vehicle and a second vehicle, the vehicle information including a vehicle speed;

determining whether the first vehicle becomes an obstacle to travel of the second vehicle, by comparing the vehicle information of the first vehicle and the vehicle information of the second vehicle;

calculating a recommended speed for the second vehicle on a basis of the vehicle information of the second vehicle, road information including a distance between intersections, and information regarding change timing of a traffic signal at each intersection, when it is determined that the first vehicle does not become an obstacle to the travel of the host vehicle, and calculating the recommended speed on a basis of the vehicle information of the second vehicle, the road information, the information regarding the change timing of the traffic signal, and an arrival delay time for avoiding an obstacle caused by the first vehicle, when it is determined that the first vehicle becomes the obstacle to the travel of the second vehicle; and transmitting the recommended speed calculated by the calculating to the second vehicle.

12. The method according to claim 11, wherein, in the determining, a first time from when the second vehicle stops at a red signal ahead of the first vehicle until the second vehicle starts moving at a next green signal is determined on a basis of the vehicle information of the second vehicle and the information regarding the change timing of the traffic signal at the intersection located ahead of the first vehicle, and whether the second vehicle becomes an obstacle to the travel of the first vehicle is determined on a basis of the first time.

13. The method according to claim 11, wherein, in the receiving, vehicle information of the second vehicle including right-and-left turn information indicating that the second vehicle makes a right turn or a left turn at the intersection located ahead of the first vehicle; and in the determining, information of a second time for the second vehicle to complete the right turn or the left turn at the intersection, the second time information being stored in a delay-time information storage unit, is referred to on a basis of the right-and-left turn information included in the other-vehicle information, and whether the other vehicle becomes an obstacle to the travel of the first vehicle is determined on a basis of the second time information.

14. The method according to claim 11, wherein, in the receiving, vehicle information of an other vehicle including merge information indicating that the other vehicle merges ahead of the first vehicle is received, and in the determining, information of a third time for a vehicle to reach a normal travel speed when the vehicle merges into a road from a facility along the road or from a side road, the third time information being stored in a delay-time information storage unit, is referred to on a basis of the merge information included in the other vehicle information, and whether the other vehicle that merges ahead of the first vehicle becomes an obstacle to the travel of the host vehicle is determined on a basis of the third time.

15. The method according to claim 11, wherein, in the receiving, vehicle information of an other vehicle including destination information indicating that a destination of the other vehicle is a facility along a road is received; and in the determining, information of a fourth time for a vehicle to complete entry into the facility along the road, the fourth time information being stored in a delay-time information storage unit, is referred to on a basis of the destination information included in the other vehicle information, and whether the other vehicle becomes an obstacle to the travel of the first vehicle is determined on a basis of the fourth time.

* * * * *